United States Patent

[11] 3,614,130

[72] Inventor Harry D. Forse
 220 Woods Road, Edgewood Addition,
 Anderson, Ind. 46011
[21] Appl. No. 875,409
[22] Filed Nov. 10, 1969
[45] Patented Oct. 19, 1971

[54] BICYCLE
 13 Claims, 8 Drawing Figs.
[52] U.S. Cl. .................................................. 280/261,
 280/278
[51] Int. Cl. ................................................... B62m 1/02
[50] Field of Search ......................................... 280/221,
 261, 278, 7.15, 112

[56] References Cited
 UNITED STATES PATENTS
 2,602,677 7/1952 Connolly ..................... 280/261
 3,113,785 12/1963 Bohnenkamp ............... 280/7.15

*Primary Examiner*—Benjamin Hersh
*Assistant Examiner*—Robert R. Song
*Attorney*—Hood, Gust, Irish & Lundy

ABSTRACT: A bicycle comprising a frame, seat, rear and front wheels, and a chain drive assembly. The drive assembly includes a rear sprocket conventionally connected to the rear wheel and a front sprocket which is conventionally rotated by means of pedals. The means supporting the front sprocket and the seat are connected together so that the front sprocket and seat can be selectively and simultaneously raised and lowered. A steering wheel is provided in lieu of conventional handlebars, the steering wheel being connected to the conventional steering post by means of a universal joint.

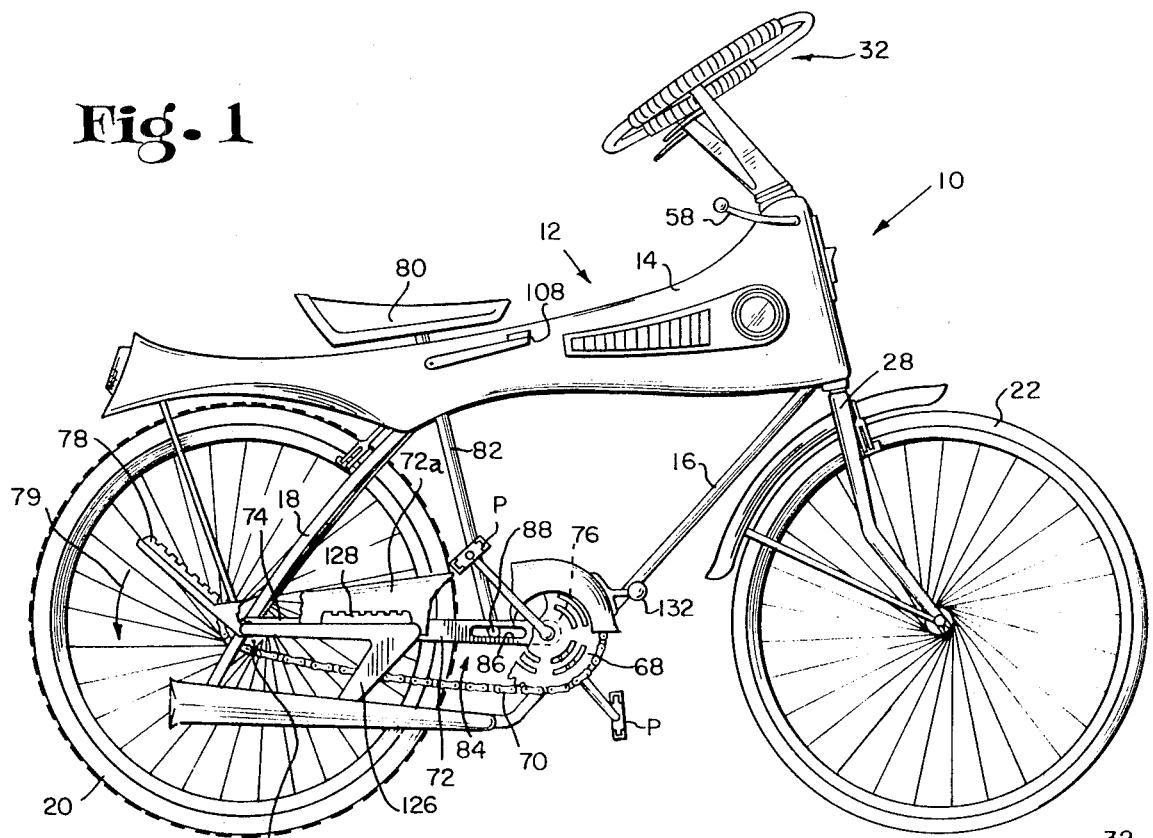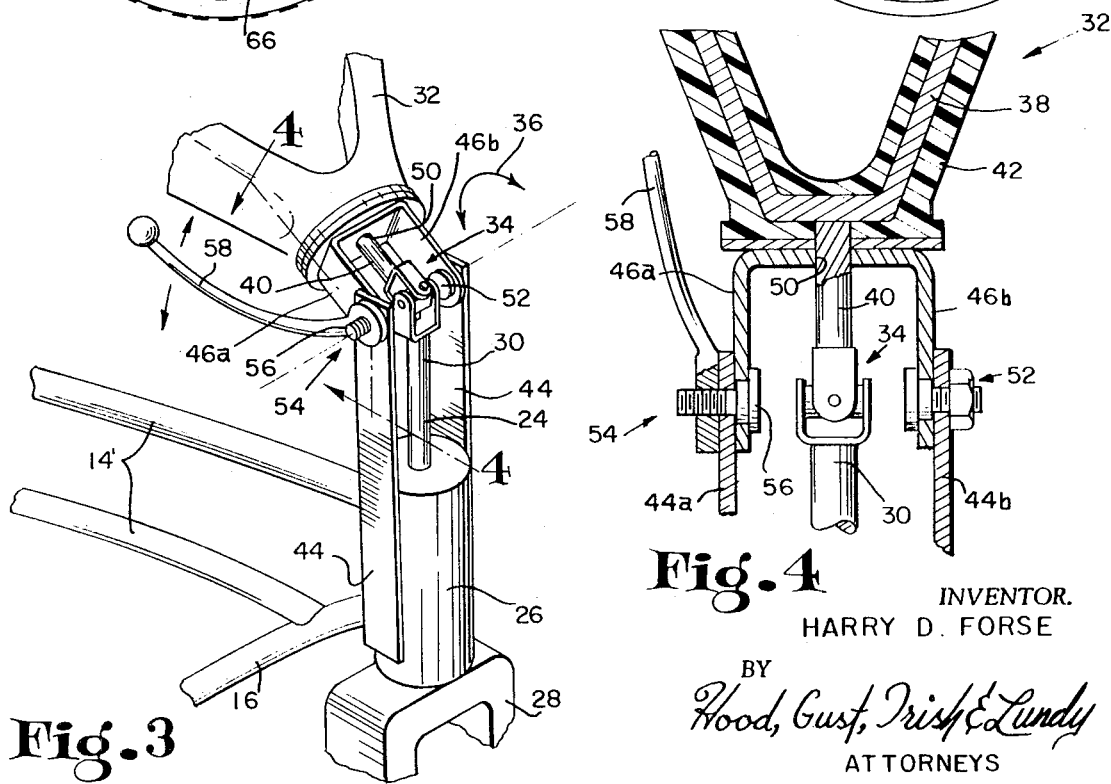

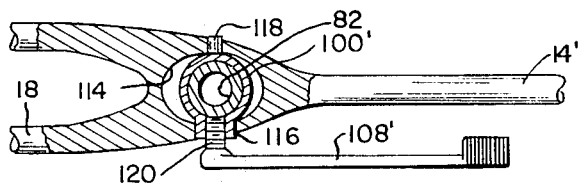
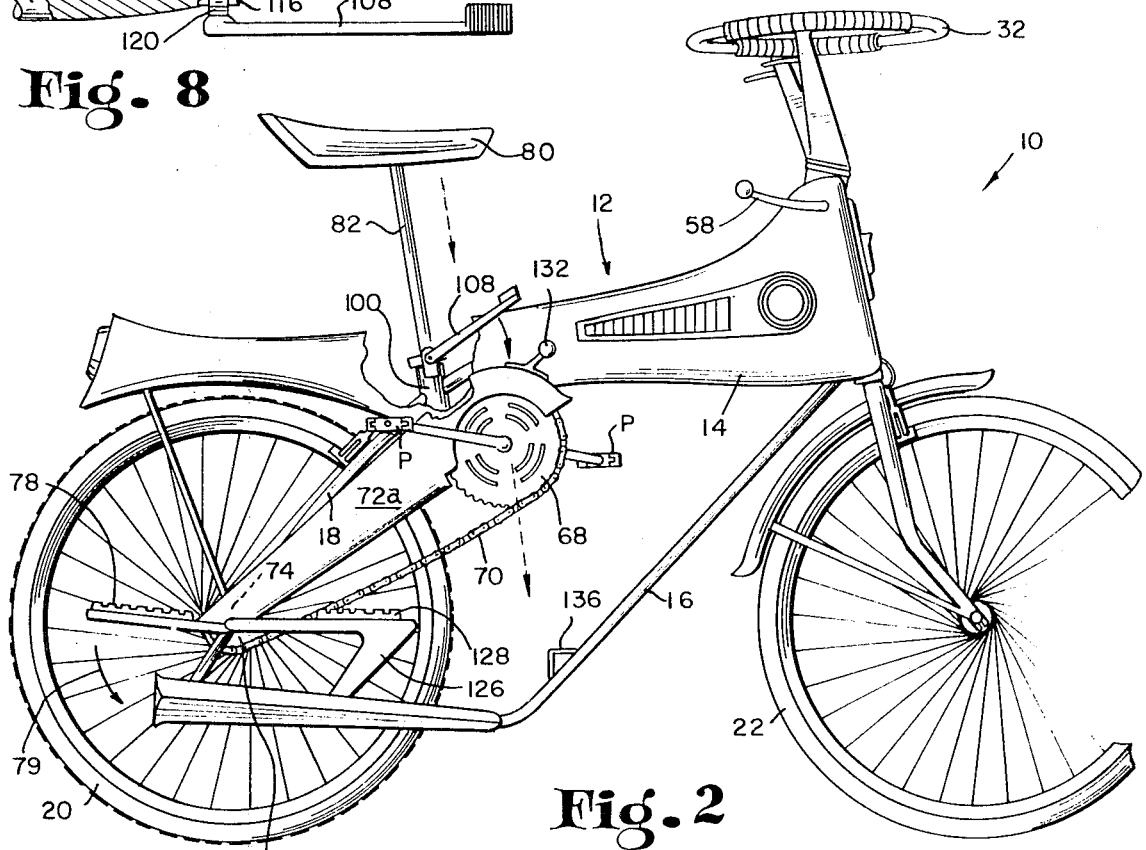
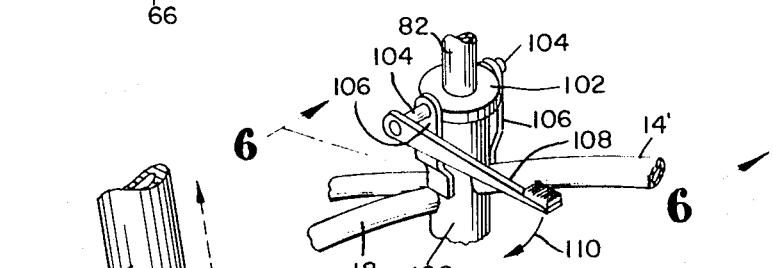
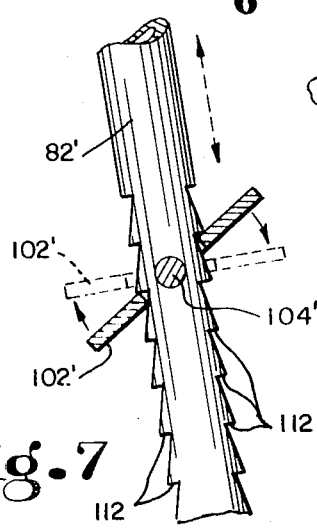
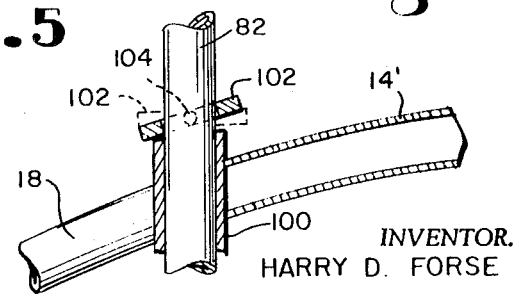

3,614,130

BICYCLE

BACKGROUND OF THE INVENTION

1. Field of the Invention

The present invention relates to bicycles, and more particularly to the provision of a bicycle having a seat-and-pedal assembly which are selectively and simultaneously raised and lowered and a steering wheel which is tiltable relative to the steering post by means of a universal joint.

2. Description of the Prior Art

Prior art bicycles have included selectively adjustable seats and selectively adjustable pedal assemblies. Prior art bicycles have also utilized steering wheels in lieu of handle bars.

The bicycle of the present invention differs from the prior art in that it includes a pedal assembly or front sprocket assembly which is selectively and simultaneously raised and lowered with the seat, a steering wheel, and means for locking the steering wheel in a selected tilted position relative to the bicycle frame and seat.

SUMMARY OF THE INVENTION

The bicycle of the present invention comprises a frame, a rear wheel for supporting the frame, a seat, a post for supporting the seat on the frame, and means for driving the rear wheel. The driving means includes a first sprocket connected to the rear wheel for rotation therewith about the axis of the wheel, a second sprocket spaced forwardly of the first sprocket, and endless flexible means for drivingly connecting the sprockets. A generally forwardly extending bar having a rear end portion and a forward end portion is provided, the rear end portion being mounted on the bicycle frame for pivotal movement about an axis generally parallel to the rear wheel axis. Preferably, the bar will be pivoted about the axis of the rear wheel. The second sprocket is journal mounted on the forward end portion of the bar for rotation about an axis generally parallel to the rear wheel axis. The lower end of the post which supports the seat is connected to the bar which supports the second sprocket and means is provided for selectively and simultaneously raising and lowering the post and bar vertically to position the seat and second sprocket relative to the bicycle frame.

The bicycle of the present invention further includes a front wheel and a steering post for connecting the front wheel to the frame, the steering post having the conventional lower forked portion to which the front wheel is journaled and an upper portion. A steering wheel is provided for steering the bicycle, this steering wheel being connected to the upper end portion of the steering post by means of a universal joint. Thus, the steering wheel is tiltable to accommodate the position of the seat and the second sprocket. Means is provided for locking the steering wheel in a selected tilted position relative to the bicycle frame and seat.

Recognizing that children enjoy being different and appearing different, it is an object of the present invention to provide a bicycle which will appeal to children in that it can be drastically changed in appearance with a minimum of effort. The seat and pedal assembly of the bicycle can be elevated so that the rider of the bicycle will be positioned considerably higher than the rider of a conventional bicycle. The tiltable steering wheel of the bicycle can be locked in tilted positions corresponding to the various positions in which the seat may be locked.

The above-mentioned and other features and objects of this invention and the manner of attaining them will become more apparent and the invention itself will be best understood by reference to the following description of an embodiment of the invention taken in conjunction with the accompanying drawings wherein:

BRIEF DESCRIPTION OF THE DRAWINGS

FIG. 1 is an elevational view, partially cut away of the bicycle of the present invention showing the seat and pedal assembly in their lowest respective positions and the steering wheel in the position corresponding to the lowest position of the seat;

FIG. 2 is an elevational view, partially cut away, showing the bicycle of the present invention with the seat and pedal assemblies in their highest respective positions and the steering wheel tilted to the position corresponding to the uppermost position of the seat;

FIG. 3 is a fragmentary perspective view showing the universal joint connection between the steering wheel and the steering post of the bicycle and means for locking the steering wheel in a selected tilted position relative to the bicycle frame;

FIG. 4 is a fragmentary sectional view taken from FIG. 3 generally along the line 4—4;

FIG. 5 is a fragmentary, sectional view showing one means for locking the seat post in a selected position;

FIG. 6 is a fragmentary, sectional view taken from FIG. 5 generally along line 6—6;

FIG. 7 is an enlarged, fragmentary sectional view showing an alternative means for locking the seat post in a selected position; and FIG. 8 is a fragmentary sectional view showing another alternative means for locking the seat post in a selected position.

DESCRIPTION OF THE PREFERRED EMBODIMENT

Referring now to the drawings, it will be seen that there is illustrated a bicycle 10 comprising a frame 12 including frame portions 14, 16, 18 which are rigidly connected together by means such as welding. The bicycle 10 comprises a rear wheel 20 and a front wheel 22, the front wheel 22 being connected to the frame 12 by means of a conventional steering post 24 which is journaled in an upwardly extending sleeve 26 (FIG. 3) rigidly attached to the forward end of the frame 12. The steering post 24 is conventionally provided with a lower, forked portion 28 to which the front wheel 22 is journaled and an upper portion 30 which is best seen in FIGS. 3 and 4. A steering wheel 32 is drivingly connected to this upper portion 30 by means of a conventional universal joint 34 which is also best seen in FIGS. 3 and 4. This universal joint 34 permits the steering wheel 32 to be tilted as indicated by the arrow 36 (FIG. 3) relative to the steering post 24 and the frame 12 of the bicycle. In any of its tilted positions, turning of the steering wheel 32, of course, turns the front wheel 22.

The frame portion 14 of the bicycle includes the decorative hood or cover indicated at 14 in FIGS. 1 and 2 and steel bars indicated at 14' in FIGS. 3, 4, 5, 6 and 8. This hood or cover extends from the steering post 24 rearwardly past a major portion of the rear wheel.

In the illustrative embodiment, the steering wheel 32 includes a metal frame element 38 to which is rigidly attached a post 40 (FIGS. 3 and 4) which is, in turn, connected at its lower end to the universal joint 34. The steering wheel frame 38 may be covered with plastic for aesthetic reasons as indicated at 42.

Preferably, means will be provided for locking the steering wheel 32 in selected tilted positions relative to the frame 12 of the bicycle. In the illustrative embodiment, first bracket means including a pair of bracket portions 44a, 44b are rigidly attached to the forward portion of the frame 12 to extend upwardly. Then, second bracket means including a member providing downwardly extending bracket portions 46a, 46b is connected to the steering wheel 32 for relative movement only about the rotational axis of the steering wheel, i.e., about the axis of the downwardly extending post 40. In FIGS. 3 and 4, it will be seen that the post 40 extends through an opening 50 in the member which provides the bracket portions 46a, 46b. The bracket portions 44a, 44b extend alongside, respectively, bracket portions 46a, 46b. Fastening elements, indicated generally at 52, are provided for pivotally connecting bracket portions 44b, 46b. Other fastening elements, indicated generally at 54, are provided for pivotally connecting bracket portions 44a, 46a. The fastening elements 54 include a threaded fastening element 56 which penetrates through both portions 44a, 46a and a lever 58, a portion of which threadedly engages the fastening element 56. It will be seen that the bracket portions 44a, 46a are generally flat and parallel and in contact. Thus, when the lever 58 is operated to tighten the connection indicated generally at 54, the bracket portions 44a, 46a will be held tightly together and, therefore, frictionally locked against relative movement.

The bicycle 10 comprises means for driving the rear wheel 20, the driving means including a first (rear) sprocket 66 conventionally connected to the rear wheel for rotation therewith about the axis of the wheel, a second (forward) sprocket 68 spaced forwardly of the first sprocket, and a chain 70 for drivingly connecting the sprockets. The second sprocket 68 is conventionally driven by pedals P. In conventional bicycles, the forward sprocket is conventionally journal mounted at a fixed location on the bicycle frame. The second sprocket 68 is mounted on an assembly which pivots about the axis of the rear wheel 20. In the illustrative embodiment there is a chain guard assembly including a generally forwardly extending bar 72 having a rear end portion 74 and a forward end portion 76. This bar 72 may be a structurally rigid component of the illustrated rather ornamental chain guard assembly and it is for this reason that the bar is indicated by the reference numeral 72 and the chain guard assembly is indicated by the reference numeral 72a.

The rear end portion 74 of the bar 72 is preferably connected to the frame 12 for pivotal movement about the axis of the rear wheel 20. The sprocket 68 is journal mounted on the forward end portion 76 of the bar 72 for rotation about an axis which is parallel to the rear wheel 20 axis.

A treadle 78 is rigidly attached to the rear end portion 74 of the bar 72 to extend rearwardly from the pivot axis thereof. The forward end portion 76 of the bar 72 is lifted upwardly by pushing downwardly as indicated by the arrow 79 on the treadle 78. Since the second sprocket 68 is journal mounted on this forward end portion 76, the pedal assembly, i.e., the sprocket 68 and the pedals P, can be lifted upwardly by pushing downwardly on the treadle 78.

The bicycle 10 includes a seat 80 which may be conventionally mounted on a seat post 82, the lower end of which is pivotally connected to the bar 72 as indicated at 84. Since the bar 72 swings upwardly about the axis of the rear wheel, it may be advisable for the pivotal connection 84 to be accomplished by means of an elongated slot 86 in the bar 72 and a pin 88 which is rigidly connected to the lower end of the post 82 and which rides in the slot 86. In this manner, the bar 72 and post 82 can be raised without pivoting the post about an axis which is parallel to the wheel 20 axis. Thus, the post 82 can be reciprocably received in a sleeve such as indicated at 100 in FIGS. 2, 5 and 6, which sleeve is rigidly welded to the frame 12 of the bicycle. An alternative to this type of pivotal connection indicated at 84 in FIG. 1 will be discussed in conjunction with FIG. 8.

Since the post 82 is connected to the bar 72, the post and the bar are simultaneously raised and lowered by means of the treadle 78. Thus, the seat 80 and the pedals P are simultaneously raised and lowered.

According to the present invention, means are provided for selectively locking the seat 80 and pedals P at the desired height relative to the frame 12. In the illustrative embodiment, this locking of the seat and pedal assembly is accomplished by clamping or fastening the post 82 at a selected position relative to the sleeve 100.

In FIGS. 5 and 6, there is illustrated a clamping washer 102 which is disposed above the sleeve 100 and through which the post 82 extends. The washer 102 is mounted for pivotal movement about a diametrically extending axis which is perpendicular to the axis of the sleeve 100 and which is defined by the illustrated rocker shafts 104. The rocker shafts 104 are rockably supported by diametrically oppositely disposed brackets 106 which may be welded to the sleeve 100. A lever 108 is rigidly attached to the end of one shaft 104 to provide means for tilting the washer 102. Preferably, the center opening in the washer 102 will be just slightly larger than the outer diameter of the post 82 so that, when the washer is tilted to a plane which is perpendicular to the axis of the post 82, the post can reciprocate freely through the washer and so that, when the washer is tilted to a plane inclined to the axis of the post, the internal surface of the washer will engage the external surface of the post frictionally to resist movement of the post. In FIG. 6, the washer is shown in solid lines in its frictional locking position and in broken lines in its nonlocking position. The washer 102 is moved from its locking position to its nonlocking position by pivoting the lever 108 in the direction of the arrow 110 (FIG. 5). Spring means, not shown, may be used for yieldably urging the washer 102 to its locking position.

Referring to FIG. 7, another locking means will be discussed. In FIG. 7, the post indicated at 82' is notched as indicated at 112 for more secure engagement by the washer 102' when it is in its locking position. The notches 112 are merely illustrative and even the slightest of indentations longitudinally spaced along diametrically opposite sides of the posts 82' will increase the holding power of the washer 102'.

Referring now to FIG. 8, it will be seen that there is illustrated a sleeve 100' through which the post 82 extends. This sleeve 100' is disposed in a longitudinally elongated slot such as indicated at 114 and is mounted for pivotal movement on the frame 12 by means of trunnions 116, 118. That is, the sleeve 100' is pivotally movable relative to the bicycle frame 12 about an axis which is generally parallel to the axis of the rear wheel 20. When the pivotally movable sleeve 100' is used, the connection between the lower end of the post 82 and the bar 72 may be a conventional pivotal connection which does not permit movement of the end of the post longitudinally along the bar. When the pivoted sleeve 100' is used with such a conventional pivotal connection between the post 82 and bar 72 raising and lowering the bar will result in a slight tilting of the post about the axis defined by the trunnions 116, 118.

In the embodiment of FIG. 8, the post 82 is frictionally locked in selected positions relative to the sleeve 100' by means of a setscrew 120 which threadedly engages a bore of the trunnion 116. The screw 120 is advanced to engage the post 82 by pivoting a lever 108' rigidly connected to the outer end of the screw.

The bicycle 10 includes a stand or platform 126 which is rigidly attached to the frame 12 and which provides a foot piece 128 disposed generally behind the pedal assembly when it is in its lower position. The platform 126 includes a footpad or foot piece 128 on which the rider of the bicycle 10 can stand or place his foot when raising and lowering the seat 80. The platform 126 and foot piece 128 will be placed far enough behind the sprocket 68 and pedals P that they will not interfere with the pedaling of the bicycle.

In FIG. 2, there is illustrated a stop bracket 136 located on the frame portion 16 and arranged to limit the downward movement of the bar 72. This stop bracket 136 serves to establish the lowest position of the sprocket 68.

In FIGS. 1 and 2, there is illustrated a hand-operated lever 132 which may be used to lift the pedal assembly to the desired elevation.

It will be readily understood that the pedal-and-seat assembly 68, 80 may be selectively raised by a small, hand-actuated hydraulic pump, or by means of a battery-powered electric actuator motor.

While there have been discussed above the principles of this invention, in conjunction with specific apparatus, it is to be clearly understood that this description is made by way of example and not as a limitation to the scope of the invention.

What is claimed is:

1. A bicycle comprising a frame, a rear wheel for supporting said frame, a seat, a post for supporting said seat on said frame, a pedal assembly for driving said rear wheel, said assembly including a first sprocket connected to said rear wheel for rotation therewith about the axis thereof, a second sprocket spaced forwardly of said first sprocket, pedals for driving said second sprocket, endless flexible means for drivingly connecting said sprockets, and means for supporting said second sprocket for movement between a lower position on said frame and an upper position on said frame, said post being connected to said support means for movement therewith, and means for locking said support means in selected positions between said upper and lower positions thereby to position said seat and said pedal assembly.

2. The bicycle of claim 1 in which said locking means includes means for locking said post against movement relative to said frame.

3. A bicycle comprising a frame, a rear wheel for supporting said frame, a seat, a post for supporting said seat on said frame, means for driving said rear wheel including a first sprocket connected to said rear wheel for rotation therewith about the axis thereof, a second sprocket spaced forwardly of said first sprocket, and endless flexible means for drivingly connecting said sprockets, a generally forwardly extending bar having a rear end portion and a forward end portion, means for mounting the rear end portion of said bar on said frame for pivotal movement about an axis generally parallel to said rear wheel axis, said second sprocket being journal mounted on the forward end portion of said bar for rotation about an axis generally parallel to said rear wheel axis, means for connecting said post to said bar, and means for selectively and simultaneously raising and lowering said post and bar vertically to position said seat and said second sprocket relative to said frame.

4. The bicycle of claim 3 including a front wheel and a steering post for connecting said front wheel to said frame, said steering post having a lower forked portion to which said front wheel is journaled and an upper portion, a steering wheel, a universal joint for drivingly connecting said steering wheel to said upper portion where by said steering wheel is pivotally movable relative to said steering post, and means for locking said steering wheel in a selected tilted position relative to said frame and seat.

5. The bicycle of claim 4 in which said locking means includes first bracket means rigidly connected to said frame and second bracket means connected to said steering wheel for relative movement only about the rotational axis of said steering wheel, a portion of said second bracket means extending alongside a portion of said first bracket means, and means for fastening said bracket portions against relative movement.

6. The bicycle of claim 5 in which said fastening means includes a threaded fastening element penetrating said bracket portions and a lever including a portion of which threadedly engages said fastening element, said fastening element and said lever being effective frictionally to lock said bracket portions against relative movement.

7. The bicycle of claim 3 including means for raising said bar and post, the last said means including a treadle rigidly attached to said rear end portion of said bar to extend rearwardly from the pivot axis thereof.

8. The bicycle of claim 7 wherein said raising means further includes a foot piece member on said frame located so that the rider may place one foot upon said member and the other upon said treadle thereby to raise said bar and post.

10. The bicycle of claim 9 in which said clamping means includes lever-operated means for frictionally engaging said post.

9. The bicycle of claim 3 in which said raising and lowering means includes means for selectively clamping said post against movement relative to said frame.

11. The bicycle of claim 9 including means for raising said bar and post, the last said means including a treadle rigidly attached to said rear end portion of said bar to extend rearwardly from the pivot axis thereof.

12. The bicycle of claim 9 including means for raising said bar and post, the last said means including a hand-operated lever connected to said bar.

13. The bicycle of claim 8 including a front wheel and a steering post for connecting said front wheel to said frame, said steering post having a lower forked portion to which said front wheel is journaled and an upper portion, a steering wheel, a universal joint for drivingly connecting said steering wheel to said upper portion whereby said steering wheel is pivotally movable relative to said steering post, and means for locking said steering wheel in a selected tilted position relative to said frame and seat.